(12) United States Patent
Bremer

(10) Patent No.: US 7,967,554 B2
(45) Date of Patent: Jun. 28, 2011

(54) TURBINE COOLING AIR CENTRIFUGAL PARTICLE SEPARATOR

(75) Inventor: Thomas Bremer, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1285 days.

(21) Appl. No.: 11/764,513

(22) Filed: Jun. 18, 2007

(65) Prior Publication Data
US 2008/0310951 A1 Dec. 18, 2008

(51) Int. Cl.
*F01D 25/00* (2006.01)
(52) U.S. Cl. .................... 415/121.2; 60/39.092
(58) Field of Classification Search .............. 415/121.2; 60/39.092
See application file for complete search history.

(56) References Cited

U.S. PATENT DOCUMENTS

| | | | |
|---|---|---|---|
| 3,356,340 A * | 12/1967 | Bobo | 415/121.2 |
| 3,673,771 A | 7/1972 | Dickey | |
| 3,720,045 A | 3/1973 | Murphy | |
| 3,751,907 A | 8/1973 | Anderson | |
| 3,918,835 A | 11/1975 | Yamarik et al. | |
| 3,993,463 A | 11/1976 | Barr | |
| 4,309,147 A | 1/1982 | Koster et al. | |
| 4,386,780 A | 6/1983 | Dernedde | |
| 4,402,515 A | 9/1983 | Malott | |
| 4,718,818 A | 1/1988 | Premont | |
| 4,798,047 A | 1/1989 | Geary | |
| 5,558,496 A | 9/1996 | Woodmansee et al. | |
| 5,837,019 A | 11/1998 | Endres | |
| 6,413,044 B1 | 7/2002 | Roeloffs | |
| 7,137,777 B2 | 11/2006 | Fried et al. | |
| 7,658,061 B2 * | 2/2010 | Kawamoto et al. | 60/39.092 |
| 2007/0048127 A1 | 3/2007 | O'Neill et al. | |

FOREIGN PATENT DOCUMENTS

JP 2002242699 A * 8/2002
WO WO 2006061929 A1 * 6/2006

* cited by examiner

*Primary Examiner* — Richard Edgar
(74) *Attorney, Agent, or Firm* — Ingrassia Fisher & Lorenz, P.C.

(57) ABSTRACT

A centrifugal particle separator removes particles such as dust particles from a compressed airflow prior to reaching and cooling the turbine blades of a turbine engine. A particle separator structure defines a plurality of inward-facing pockets which are separated by pocket dividers defining an airflow path having a diameter that decreases from the entrance to the exit. A centrifugal force created by the rotating centrifugal particle separator assembly causes particles to collect within the plurality of pockets and the remaining compressed air is provided to cool the turbine blades. The decreasing diameter of the airflow path forces the airflow with particles to accelerate to a rotational velocity greater than that of the rotating particle separator by conservation of momentum.

14 Claims, 3 Drawing Sheets

TURBINE COOLING AIR CENTRIFUGAL PARTICLE SEPARATOR

FIELD OF THE INVENTION

The present invention generally relates to aircraft engine rotor components and, more particularly, to a method and apparatus for removing particles such as dust from the airflow prior to cooling the turbine blades.

BACKGROUND OF THE INVENTION

Gas turbine engines are often used to power aircraft and to supply industrial power. A gas turbine engine includes, for example, four major sections: compressor, combustor, turbine, and exhaust.

The compressor section raises the pressure of the air to a relatively high level. Compressor components such as compressor blades and impellers are primary components in this cold section for any turbine engine. The compressed air from the compressor section then enters the combustor (hot) section, where a ring of fuel nozzles injects a steady stream of fuel. The injected fuel is combusted by a burner, which significantly increases the energy of the compressed air.

The high-energy compressed air from the combustor section then flows into and through the turbine section, causing rotationally mounted turbine blades to rotate and generate mechanical energy. Specifically, high-energy compressed air impinges on turbine vanes and turbine blades, causing the turbine to rotate. Rotation speeds greater than 39,000 rpm are common. The turbine includes one or more shafts that are used to drive a generator for supplying electrical power, and to drive its own compressor and/or an external load compressor. The air exiting the turbine section is exhausted from the engine via the exhaust section.

Ingestion of microscopic particles, e.g., dust, that is entrained in incoming engine air flow poses one of the most significant limitations to turbine engine durability. A small portion of the engine airflow is routed through cooling passages in the turbine blades and nozzles, where accumulation of particles over time can block the cooling air flow and cover the surfaces with an insulating particle layer that reduces cooling effectiveness. Additionally, any corrosive substances in the particles may chemically react with the base alloy at the high turbine operating temperatures, thereby corroding the surfaces. Over time, continued particle accumulation can lead to failure of the turbine blades and vanes. The most common symptom of such component failure is a large performance decrease, resulting in premature removal of the engine for low power output. Occasionally, symptoms are not observed until there is a failure of the turbine with extensive secondary damage to the engine resulting high repair cost.

The effects of turbine damage due to particle ingestion are of particular concern in turbine engines that operate for significant periods in dusty or polluted near-ground environments, for example, auxiliary power units (APU's), ground vehicle engines, and military helicopter engines. Traditional approaches to prevent particle ingestion damage include maintenance only or particle separation at the engine inlet.

Many engines have no devices to mitigate the effects of particle ingestion, and rely only on engine maintenance. The consequences of particle ingestion are dealt with through engine removal and repair when the engine shows symptoms of functional impairment. In high-risk applications, proactive engine removal may be accomplished at prescribed intervals after first use or after the previous engine overhaul. These approaches are inherently expensive as they allow turbine deterioration to proceed unimpeded, resulting in frequent replacement of high-cost turbine components, and more extensive replacement of engine components in cases of catastrophic turbine failures with widespread secondary damage.

Devices may be installed at the engine inlet to remove particle from incoming air. Such devices fall into two categories: inertial particle separators and inlet barrier filters.

Inertial particle separators rapidly turn the engine incoming airflow at the engine air inlet, with the intent that the inertia of incoming particles causes them to continue in a straight path, being unable to negotiate the sharp turns of the main airflow into the core of the engine. The particles are then eliminated from the system by a scavenge blower that draws its incoming air from the region of particle accumulation. The sharp turn of incoming air is accomplished either by a sudden sharp inward turn into the engine core with scavenge flow drawn from the outer wall, or in an array of vortex tubes having spiral-shaped fins which spin the incoming air and scavenge the particle from the outer walls of the tubes. These inertial particle separators can process large amounts of air with minimal pressure loss, while removing most large particles from the incoming air flow. However, these separators may allow considerable amounts of the smaller particles to enter the engine core.

Inlet barrier systems use a filter that mechanically traps incoming particles. The barrier systems can offer very high separation efficiencies down to the smallest particles, depending on the design of the filter. However, the barrier systems present a considerable resistance to the incoming air flow which reduces engine performance. This resistance increases as the barrier becomes clogged with particles over time. Recurring maintenance is needed for cleaning or replacement of the filter. The large filter surface area needed to pass the entire engine inlet airflow without large performance decrements typically results in very large inlet hardware.

These known engine inlet particle separation systems, while reducing the rate of turbine deterioration due to particle ingestion, add considerable cost and weight to the engine. They are bulky and are difficult to integrate the engine into the aircraft or vehicle, and pose an overall performance loss due to either the energy needed to drive the scavenge blower or the inlet pressure loss of a barrier filter. The performance loss of an inlet particle separation system is manifested as either, or a combination of reduced power output, increased fuel consumption, and increased turbine operating temperature (which accelerates turbine deterioration).

Other known methods to reduce particle damage include using the rotation of the rotor and the centrifugal force thereby created to separate the particle from the airflow. See for example, U.S. Pat. Nos. 3,673,771, 3,918,835, and 4,309,147. However, enhanced dust separation over these existing devices is needed.

Accordingly, it is desirable to provide a method and apparatus for removing particles from the airflow prior to reaching the turbine blades. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method are provided for removing particles from the airflow prior to reaching the turbine blades of a jet engine. The apparatus rotates around the axis of the turbine engine and includes a particle separator structure having a side facing the axis, wherein the side includes a plurality of pocket dividers defining a plurality of pockets. The particle separator structure further defines an entrance cavity for receiving the compressed air containing particles from a compressor. An inner flowpath coupling includes a side opposed to the axis that is positioned adjacent the particle separator structure to define an airflow path having an entrance communicating with the entrance cavity and an exit, wherein the diameter of the airflow path decreases from the entrance to the exit, wherein a centrifugal force created by the centrifugal particle separator assembly rotating around the axis and the decreasing diameter of the airflow path forces the particles to collect within the plurality of pockets and the remaining compressed air is provided to cool turbine blades. A plurality of optional air accelerator fins may be positioned within the entrance cavity. The combination of moving the air through an airflow path having a decreasing diameter, while subjecting the air to a centrifugal force, efficiently removes the particles from the air.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Before proceeding with a detailed description, it is to be appreciated that the described embodiment is not limited to use in conjunction with a particular type of turbine engine, or even to use in a turbine. Thus, although the present embodiment is, for convenience of explanation, depicted and described as being implemented in an auxiliary power unit (APU), it will be appreciated that it can be implemented in various other types of turbines, and in various other systems and environments.

An APU is, in most instances, a gas turbine engine that includes a compressor, a combustion system, and a turbine. During operation of the APU, the compressor draws in ambient air, compresses it, and supplies compressed air to the combustion system. The combustion system receives fuel from a fuel source and the compressed air from the compressor, and supplies high-energy combusted air to the turbine, causing it to rotate. The turbine includes a shaft that may be used to drive a generator for supplying electrical power, and to drive its own compressor and/or an external load compressor.

A portion of the compressor exit air is diverted prior to entering the combustion system, and is routed to the cooling air passages of the turbine, in order to maintain metal temperature at a level below gas path temperature to assure acceptable durability. The centrifugal particle separator described herein removes dust particles from the compressed cooling air before providing the cooling air to cool the turbine blades, thereby minimizing the reduction over time of air flow and cooling effectiveness by preventing particle accumulation in the cooling air passages and reduce the rate of surface corrosion caused by corrosive substances in the particles.

Figure 1:
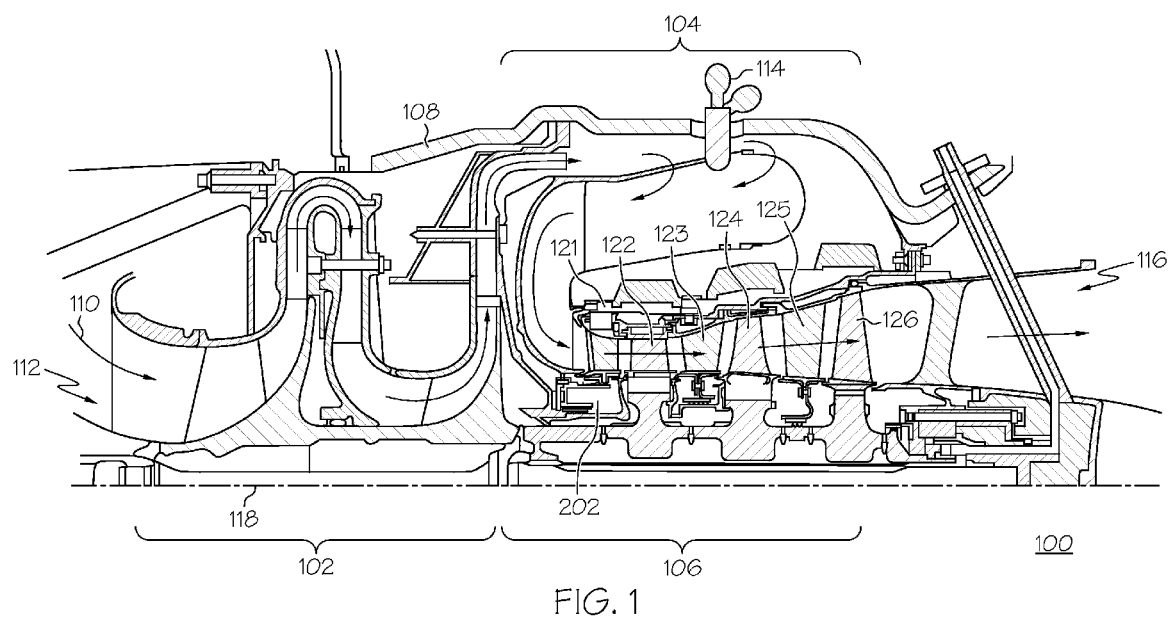
FIG. 1 is a cross section view of a portion of an auxiliary power unit according to an exemplary embodiment.

Turning now to the description and with reference to FIG. 1, a cross section view of a portion of an exemplary embodiment of an auxiliary power unit (APU) is shown. The APU 100 includes a compressor 102, a combustion system 104, and a turbine 106, all disposed within a case 108. A core flow of air (represented by the arrows 110) is directed into the compressor 102 via an air inlet 112. The compressor 102 raises the pressure of air and supplies compressed air to the combustion system. In the depicted embodiment, the compressor 102 is a two-stage, high-pressure ratio centrifugal compressor. However, it will be appreciated that this is merely exemplary of a preferred embodiment, and that other types of compressors could also be used.

The compressed air from the compressor 102 is directed into the combustion system 104, where it is mixed with fuel supplied from fuel injectors 114. In the combustion system 104, the fuel/air mixture is combusted, generating high-energy gas. The high-energy gas is then diluted and supplied to the turbine 106. A more detailed description of the combustion system 104, and the various components that provide this functionality, is provided further below.

The high-energy, diluted gas from the combustion system 104 expands through the turbine 106, where it gives up much of its energy and causes the turbine 106 to rotate. The turbine 106 is preferably implemented as a three-stage turbine having three sets of turbine rotors 122, 124, 126 disposed downstream from turbine nozzles 121, 123, 125, respectively. As the high-energy combusted air passes through the nozzles 121, 123, 125 and impinges on the rotors 122, 124, 126, the rotors 122, 124, 126 rotate, which in turn causes the turbine shaft 118 to rotate. The gas is then exhausted from the APU 100 via an exhaust gas outlet 116. As the turbine 106 rotates, it drives, via a turbine shaft 118, various types of equipment that may be mounted in, or coupled to, the engine 100. For example, in the depicted embodiment the turbine 106 drives the compressor 102. It will be appreciated that the turbine may also be used to drive a generator and/or a load compressor and/or other rotational equipment, which are not shown in FIG. 1 for ease of illustration.

All turbine engines include components that rotate at very high speeds, e.g., over 39,000 rpm for internally-cooled axial turbines. These high rotating speeds produce inertial, or centrifugal, forces much higher than is possible by the aerodynamic flowpath turning as in known inertial particle separators described in the Background of the Invention. The centrifugal particle separator described herein uses the extremely high centrifugal force potential of the high-speed rotating components and an engineered flow path contour that reduces in diameter to separate particle from the turbine cooling air flow.

Figure 2:
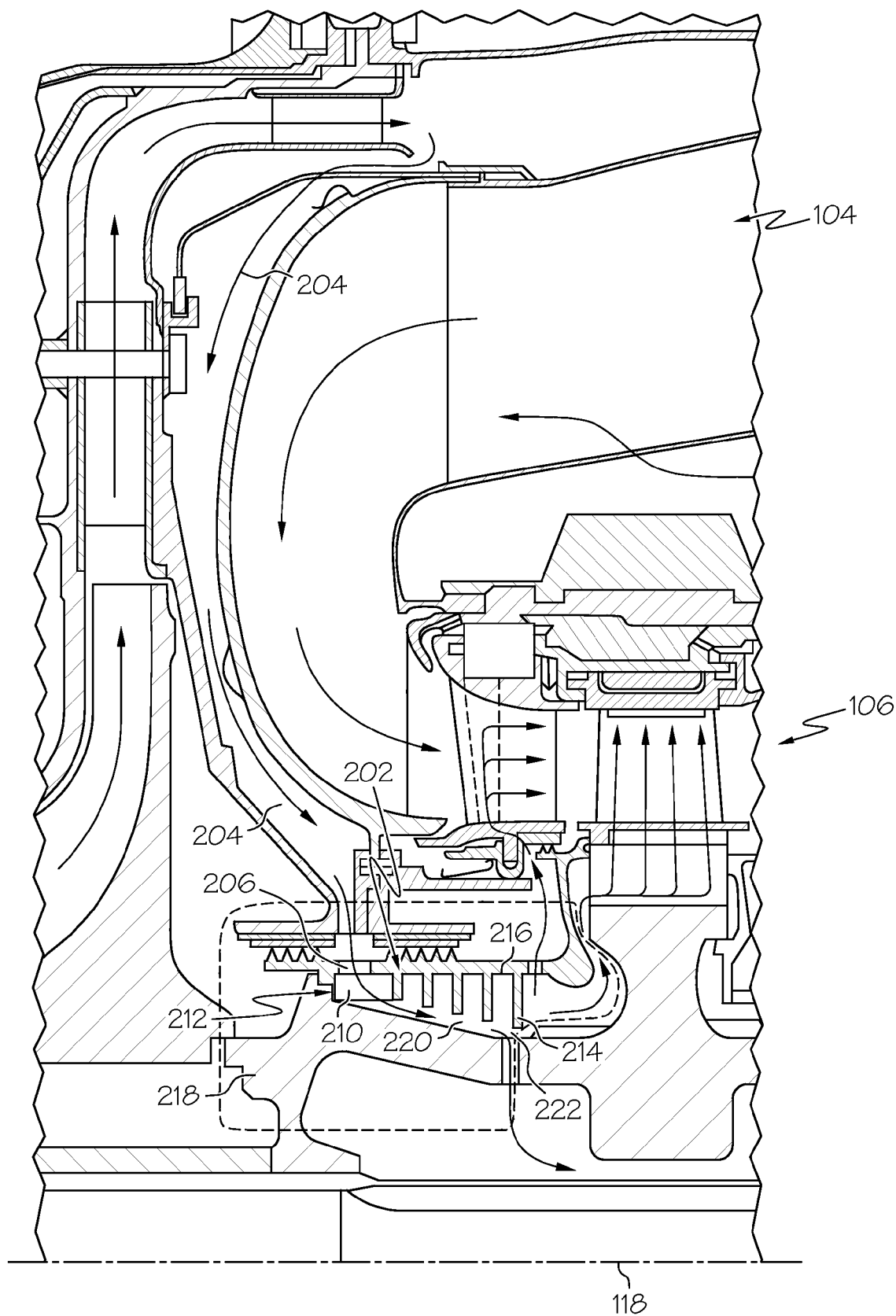
FIG. 2 is a close up cross-section view of a portion of the combustor and turbine sections of the exemplary gas turbine engine depicted in FIG. 1.

Referring to FIG. 2, and in accordance with the exemplary embodiment, a more detailed close up cross-section side view of the airflow between the combustion section 104 and the turbine section 106, including the centrifugal particle separator 202. As the air enters the combustion section 104, a portion of the air 110, referred to as cooling air 204, is directed to the centrifugal particle separator 202.

Figure 3:
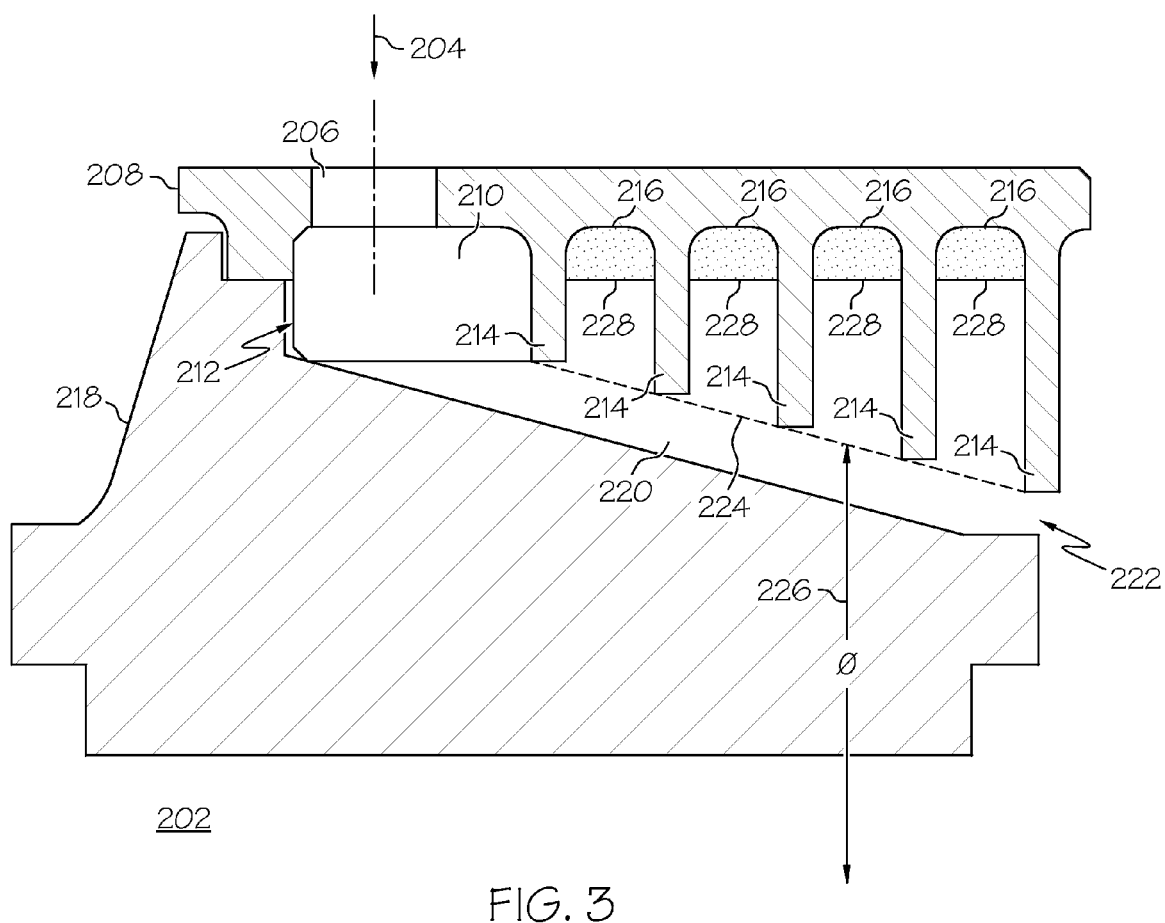
FIG. 3 is a simplified cross section view of the centrifugal particle separator according to the exemplary embodiment.

FIG. 3 is a schematic of the centrifugal particle separator assembly 202 which is also shown in FIG. 2. Cooling air 204 enters the centrifugal particle separator assembly 202 through air inlet holes 206 in a particle separator structure 208 and flows through air accelerator fins 210 positioned between the air inlet holes 206 in a fins pocket 212. The accelerator 210 fins quickly bring the air from non-rotating to rotating velocity. The inclusion of the air accelerator fins 210 and the fins pocket 212 in the preferred embodiment is optional, as other means such as angled vanes on the stationary outlet may be employed to cause rotational motion of the cooling air. The particle separator structure 208 includes a plurality of pocket dividers 214 defining a plurality of particle collection pockets 216. The particle separator structure 208 is positioned adjacent an inner flowpath coupling 218 to form an airflow path 220 between the fins pocket 212 and an air outlet annulus 222. Each successive pocket divider protrudes further inboard than the previous divider, thereby forming an outer flowpath 224 of decreasing diameter 226 (decreasing radius to the axis 118 of rotation) as air passes through the particle separator.

In operation, the centrifugal particle separator assembly 202 rotates around the axis 118. Air is introduced to the rotating separator 202 via air inlet holes 206 and is quickly brought from non-rotating to rotating velocity by the accelerator air fins 210. This rotation creates a centrifugal force slinging particles within the air flow 220 away from the axis 118 as air passes through the separator 202 from the fins pocket 212 to the air outlet annulus 222. Additionally, the decreasing diameter 226 of the outer flowpath 224 (decreasing radius from the axis 118) forces the air to accelerate in its rotational velocity due to conservation of momentum, thereby subjecting entrained dust particles to ever-increasing centrifugal forces as the air stream progresses through the centrifugal particle separator assembly 202. While four particle collection pockets 216 are shown in this exemplary embodiment, it is appreciated any number of pockets 216 may be used. However, it is preferred that at least several particle collection pockets 216 be formed. As the particles 228 in the air flow 204 are subjected to the centrifugal force, they will be forced into the particle collection pockets 216. Heavier particles will tend to fall into the first pockets encountered, and as the centrifugal forces increases due to the decreased diameter 226 of the outer flowpath 224, the smaller particles will tend to be forced in the subsequent pockets. The particle collection pockets 216 are sized to trap and hold the amount of particle 228 accumulation expected for the maximum interval between engine shop visits (scheduled maintenance), during which the particles 228 may be removed from the particle collection pockets 216.

Therefore, it is seen that the combination of the centrifugal forces, the air accelerator fins 210 that quickly accelerate cooling air from non-rotating to rotating near the air inlet 206 of the particle separator assembly 202 and the engineered flowpath contour 224 which reduces in diameter 226 from the air inlet 206 to the output annulus 222, subjects the particles 228 to ever-increasing centrifugal forces as the air stream 204 progresses through the centrifugal particle separator assembly 202. If the particle laden air 204 is brought to 100% rotating speed near the inlet 212 of the particle separator 202, an outer flowpath 224 that reduces in diameter 226 as the air 204 flows toward the output annulus 222 will force the rotational speed of the air 204 and any entrained dust particles to increase due to conservation of momentum. Although centrifugal force decreases linearly with the decrease in flowpath diameter, this is more than offset by the centrifugal force increasing with the square of the increasing rotational velocity as seen from the equation $F_C=Mr\omega^2$, where $F_C$ is centrifugal load, M is mass of the particle, r is the radius of rotation, and $\omega$ is rotational speed. This removal of particles 228 from the cooling air 204 reduces erosion of internally-cooled turbine components from heat distress and corrosion. As the airflow 204 exits the output annulus 222, it proceeds along different paths to reach the turbine blades of the rotors 122, 124, 126 to provide the required cooling thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A centrifugal particle separator assembly configured to be coupled between a compressor and turbine blades within a gas turbine, the turbine blades configured to rotate around an axis, the centrifugal particle separator assembly comprising:
   a particle separator structure having a side facing the axis, the side including a plurality of pocket dividers defining a plurality of pockets, the particle separator structure further defining an entrance cavity for receiving compressed air; and
   an inner flowpath coupling having a side opposed to the axis that is positioned adjacent the particle separator structure to define an airflow path having an entrance communicating with the entrance cavity and an exit, wherein the diameter of the airflow path decreases from the entrance to the exit;
   wherein a centrifugal force created by the centrifugal particle separator assembly rotating around the axis and the decreasing diameter of the airflow path forces at least a portion of the particles to collect within the plurality of pockets and the remaining compressed air is provided to cool the turbine blades.

2. The centrifugal particle separator assembly of claim 1 further comprising fins at the entrance to accelerate the airflow.

3. The centrifugal particle separator assembly of claim 1 further comprising means at the entrance for accelerating the airflow.

4. A gas turbine engine, comprising:
   a compressor section that provides compressed air containing particles;
   a combustion section that adds fuel and ignition to the compressed air creating high energy compressed air;
   turbine blades configured around an axis that are rotated by the high energy compressed air; and
   a centrifugal particle separator assembly that rotates around the axis, comprising:
      a particle separator structure having a side facing the axis, the side including a plurality of pocket dividers defining a plurality of pockets, the particle separator structure further defining an entrance cavity for receiving the compressed air from the compressor section; and
      an inner flowpath coupling having a side opposed to the axis that is positioned adjacent the particle separator structure to define an airflow path having an entrance communicating with the entrance cavity and an exit, wherein the diameter of the airflow path decreases from the entrance to the exit;
      wherein a centrifugal force created by the centrifugal particle separator assembly rotating around the axis and the decreasing diameter of the airflow path forces the particles to collect within the plurality of pockets and the remaining compressed air is provided to cool the turbine blades.

5. The turbine of claim 4 further comprising a plurality of air accelerator fins positioned within the entrance cavity.

6. The centrifugal particle separator assembly of claim 4 further comprising means disposed within the entrance cavity for accelerating the airflow.

7. A method of removing particles from air flowing through an airflow path of a centrifugal particle separator assembly of a turbine engine, the centrifugal particle separator assembly coupled between a compressor and turbine blades of the turbine engine, the turbine blades configured to rotate around an axis, the method comprising:

moving the air through the airflow path that reduces in diameter around the axis of rotation, thereby subjecting the air to an ever-increasing centrifugal force as conservation of momentum causes the air with particles to accelerate to a rotational velocity greater than that of the rotating particle separator assembly, and providing a boost in dust separation efficiency;

collecting particles from the air, subjected to the centrifugal force, within a plurality of pockets defined by the centrifugal particle separator assembly; and providing the remaining air to cool the turbine blades.

8. The method of claim 7 further comprising accelerating the air from non-rotating to a rotating flow prior to accelerating the flow to a higher rotational velocity than the particle separator.

9. The method of claim 7 further comprising moving the air through a means for accelerating the air from non-rotating to rotating flow prior to accelerating the flow to a higher rotational velocity than the particle separator.

10. The method of claim 7 further comprising trapping the particles as the particles react to the increasing centrifugal force as they move through the particle separator structure, caused by increasing rotational velocity due to conservation of momentum as the result of the decreasing radius of the airflow path between the entrance to the exit of the particle separator structure.

11. The method of claim 7 further comprising compressing the air prior to moving the air through the airflow path.

12. The method of claim 7 further comprising:
slinging the air away from an axis of the turbine engine; and
trapping the particles.

13. The method of claim 12 wherein the trapping step comprises trapping the particles in one or more pockets.

14. The method of claim 13 further comprising removing the particles from the one or more pockets during engine maintenance.

* * * * *